(12) United States Patent
Waelde et al.

(10) Patent No.: US 11,029,188 B2
(45) Date of Patent: Jun. 8, 2021

(54) RADAR FILL LEVEL MEASUREMENT DEVICE COMPRISING RADAR CHIPS ON DIFFERENT PLANES OF A CIRCUIT BOARD

(71) Applicant: VEGA Grieshaber KG, Wolfach (DE)

(72) Inventors: Steffen Waelde, Niedereschach (DE); Roland Welle, Hausach (DE)

(73) Assignee: VEGA Grieshaber KG, Wolfach (DE)

( * ) Notice: Subject to any disclaimer, the term of this patent is extended or adjusted under 35 U.S.C. 154(b) by 208 days.

(21) Appl. No.: 16/146,744

(22) Filed: Sep. 28, 2018

(65) Prior Publication Data
US 2019/0107427 A1 Apr. 11, 2019

(30) Foreign Application Priority Data

Oct. 6, 2017 (EP) ..................................... 17195226

(51) Int. Cl.
| | |
|---|---|
| *G01F 23/284* | (2006.01) |
| *G01S 13/42* | (2006.01) |
| *G01S 7/03* | (2006.01) |
| *G01S 13/88* | (2006.01) |
| *G01S 7/35* | (2006.01) |

(52) U.S. Cl.
CPC ............ *G01F 23/284* (2013.01); *G01S 7/032* (2013.01); *G01S 7/35* (2013.01); *G01S 13/42* (2013.01); *G01S 13/88* (2013.01)

(58) Field of Classification Search
CPC .... G01F 23/284; G01F 22/00; G01F 23/0076; G01F 23/2845; G01S 13/88; G01S 7/032; G01S 7/35; G01S 13/42; G01S 7/03; G01S 13/87; G01S 13/32; G01S 7/352; G01S 7/4021; G01S 2007/027; H01Q 1/225; H01Q 1/2283; H01Q 13/206; H01Q 15/08;
(Continued)

(56) References Cited

U.S. PATENT DOCUMENTS

| | | |
|---|---|---|
| 5,420,591 A | 5/1995 | Annee et al. |
| 9,683,882 B2 | 6/2017 | Gerding et al. |

(Continued)

FOREIGN PATENT DOCUMENTS

| | | |
|---|---|---|
| DE | 10 2014 109 A1 | 12/2015 |
| EP | 2 060 883 A1 | 5/2009 |

(Continued)

*Primary Examiner* — Olumide Ajibade Akonai
(74) *Attorney, Agent, or Firm* — Oblon, McClelland, Maier & Neustadt, L.L.P.

(57) ABSTRACT

A radar fill level measurement device for fill level measurement or for recording a topology of a filling material surface in a container is provided, including: a circuit board including a first radar chip on a first circuit board surface and a second radar chip on a second circuit board surface, the first chip and the second chip each including one or more transmission channels configured to generate a transmission signal, and one or more reception channels configured to receive the transmission signal reflected at the filling material surface, at least one of the transmission channels of the first chip being connected, via a first line, to an antenna assembly for radiating the transmission signal, and at least one of the reception channels of the second adar chip being connected, via a second line, to the antenna assembly for receiving the reflected transmission signal.

12 Claims, 15 Drawing Sheets

(58) Field of Classification Search
CPC .......... H01Q 1/48; H01Q 21/061; H01P 5/08; H03F 2200/294; H03F 3/195
See application file for complete search history.

(56) References Cited

U.S. PATENT DOCUMENTS

| | | | |
|---|---|---|---|
| 9,773,543 B1* | 9/2017 | Tavares | G11C 7/02 |
| 2007/0109178 A1 | 5/2007 | Schultheiss | |
| 2009/0128396 A1 | 5/2009 | Fehrenbach et al. | |
| 2009/0299662 A1* | 12/2009 | Fehrenbach | G01F 23/28 |
| | | | 702/55 |
| 2015/0048963 A1* | 2/2015 | Dieterle | G01S 13/88 |
| | | | 342/5 |
| 2016/0146931 A1* | 5/2016 | Rao | G01S 13/931 |
| | | | 342/59 |
| 2016/0282168 A1* | 9/2016 | Fehrenbach | G01F 23/241 |
| 2017/0023663 A1* | 1/2017 | Subburaj | G01S 13/931 |
| 2017/0090015 A1* | 3/2017 | Breen | G01S 7/032 |
| 2017/0141453 A1 | 5/2017 | Waelde et al. | |
| 2018/0287264 A1 | 10/2018 | Wälde et al. | |

FOREIGN PATENT DOCUMENTS

| | | |
|---|---|---|
| EP | 3 171 138 A1 | 5/2017 |
| WO | WO 2016/011407 A1 | 1/2016 |
| WO | WO 2016/202394 A1 | 12/2016 |

\* cited by examiner

RADAR FILL LEVEL MEASUREMENT DEVICE COMPRISING RADAR CHIPS ON DIFFERENT PLANES OF A CIRCUIT BOARD

CROSS-REFERENCE TO RELATED APPLICATIONS

This application claims the benefit of the filing date of European Patent Application No. 17 195 226.0, filed on 6 Oct. 2017, the entire content of which is incorporated herein by reference.

FIELD

The invention relates to fill level measurement and the recording of the topology of a filling material surface in a container. The invention relates in particular to a radar fill level measurement device for fill level measurement and/or for recording the topology of a filling material surface in a container.

BACKGROUND

Nowadays, radar fill level measurement devices are used for fill level measurement and for recording the topology of a filling material surface. In contrast with many other fields, the breakthrough for radar technology in fill level measurement was possible only once extremely small reflection signals could be recorded and processed by the electronics of the measurement devices.

Modern fill level measurement devices and topology measurement devices which are able to record the exact shape of the surface of a filling material are characterised not only by a high transmission frequency which is typically in the gigahertz range, for example in the range of from 75 GHz to 85 GHz, but are also able to reliably process amplitude differences of the reflected signal in a range of up to 100 dB.

In order to generate and process the high-frequency transmission signals in the range of 79 GHz, a monolithic microwave integrated circuit (MMIC) may be provided. This component may comprise a plurality of transmission and reception channels, which are also referred to in this application as radar channels, in order that the filling material surface can be scanned.

The more precisely the filling material surface is to be scanned, the more transmission and reception channels are required in order to achieve a high-quality image, and this is associated with a correspondingly large outlay for hardware and a correspondingly high energy requirement.

SUMMARY

It may be desirable to provide a radar fill level measurement device for measuring a fill level of a medium or the topology of a medium in a container.

The described embodiments relate to a radar fill level measurement device for fill level measurement or for recording the topology of a filling material surface in a container, said device comprising circuit board having a first circuit board plane, layer or surface and a second circuit board plane, layer or surface, a first radar chip on the first circuit board plane, and a second radar chip on the second circuit board plane.

The first radar chip and the second radar chip each comprise one or more transmission channels for generating a transmission signal, and one or more reception channels for recording the transmission signal that is reflected at the filling material surface. At least one of the transmission channels of the first radar chip is connected, via a first line, to an antenna assembly for radiating the transmission signal. At least one of the reception channels of the second radar chip is connected, via a second line, to the antenna assembly for receiving the reflected transmission signal.

According to an embodiment, the antenna assembly comprises a first waveguide for radiating the transmission signal towards the filling material surface.

According to a further embodiment, the antenna assembly comprises a second waveguide for receiving the reflected transmission signal.

According to a further embodiment, the first and/or the second waveguide is designed for connecting the first circuit board plane to the second circuit board plane. The first/second waveguide comprises an end region that is positioned on the bottom of the circuit board, the first/second waveguide comprising a main region that is positioned on the top of the circuit board, and a plurality of plated through-holes being arranged inside the circuit board, between the end region and the main region, in order to also form the first/second waveguide inside the circuit board.

According to a further embodiment, the first and/or the second waveguide comprises a resonant cavity in the end region thereof, which cavity is filled with a dielectric material.

According to a further embodiment, the first line is arranged on the first circuit board plane.

According to a further embodiment, the second line is arranged on the second circuit board plane.

According to a further embodiment, the first radar chip comprises a first synchronisation circuit, which is designed to generate a high-frequency signal, the second radar chip comprising a second synchronisation circuit. Furthermore, a high-frequency line assembly is provided, which is designed for transmitting the high-frequency signal from the first synchronisation circuit to the second synchronisation circuit in order to synchronise the two radar chips, the high frequency line assembly comprising a first strip conductor on the first circuit board plane, a second strip conductor on the second circuit board plane, and a via arranged therebetween for interconnecting the first and the second strip conductors.

According to a further embodiment, the high-frequency line assembly for transmitting the high-frequency signal comprises two or more different line types, which are arranged in series with one another.

According to a further embodiment, the high-frequency line assembly comprises a high-frequency amplifier that is arranged in the high-frequency line assembly and is designed for amplifying the high-frequency signal.

According to a further embodiment, the high-frequency line assembly comprises a waveguide.

According to a further embodiment, an analogue-to-digital converter is integrated between the first and the second radar chip in each case.

According to a further embodiment, the radar fill level measurement device is designed for recording the topology of a medium in a container.

According to a further embodiment, the fill level measurement device is designed as a frequency modulated continuous wave (FMCW) fill level measurement device.

Both the first radar chip and the second radar chip may comprise one or more transmission channels for radiating one transmission signal in each case towards the filling material surface, and one or more reception channels for receiving the transmission signal that is reflected at the filling material surface. One or more of the transmission channels may also be designed as a combined transceiver channel.

The radar chips may in particular may be microwave integrated circuits, which can also be referred to as a radar system-on-chip. A radar system-on-chip (RSoC) of this kind is a highly integrated microwave circuit comprising circuit components for digital functions and which, according to an embodiment, is able to integrate the entire functionality of a conventional radar system for signal generation, signal processing and conversion of the received signal, i.e., the reflected transmission signal, into a digital representation onto just one radar chip.

Each of the transmission channels may be designed to generate a high-frequency transmission signal having a frequency in the two- or three-digit gigahertz range, for example, in the range between 55 GHz and 65 GHz or between 75 GHz and 85 GHz or above.

The first radar chip may be designed as what is known as a master chip, which generates a synchronisation signal by means of which the further radar chip or chips, referred to as slave chips, is/are synchronised.

According to a further embodiment, the high-frequency signal is a high-frequency signal that is divided by an integer factor with respect to the transmission signal.

It is also possible for the amplification power of the high-frequency amplifier(s) arranged in the high-frequency line assembly to be adjusted depending on the fill level and/or for example depending on the number of radar chips currently used for the fill level measurement.

According to a further embodiment, the high-frequency amplifier has an operating frequency of approximately 20 GHz or, for example, of approximately 40 GHz.

According to a further embodiment, the first and the second radar chip are each based on BiCMOS technology. According to a further embodiment, the radar chips are based on SiGe technology. According to a further embodiment, the radar chips are based on HF CMOS technology and comprise high-frequency circuit parts for frequencies of 75 GHz and above.

According to a further embodiment, the high-frequency amplifier is a low-noise amplifier (LNA) comprising a separate voltage supply.

According to an embodiment, the high-frequency amplifier is operated solely in the linear range thereof. Optionally, a plurality of high-frequency amplifiers may be provided in the high-frequency line assembly.

BRIEF DESCRIPTION OF THE DRAWINGS

In the following, embodiments are described in detail with reference to the accompanying drawings. In the following drawings, like reference signs denote like or similar elements. The views in the drawings are schematic and not to scale.

DETAILED DESCRIPTION OF EMBODIMENTS

Figure 1A:
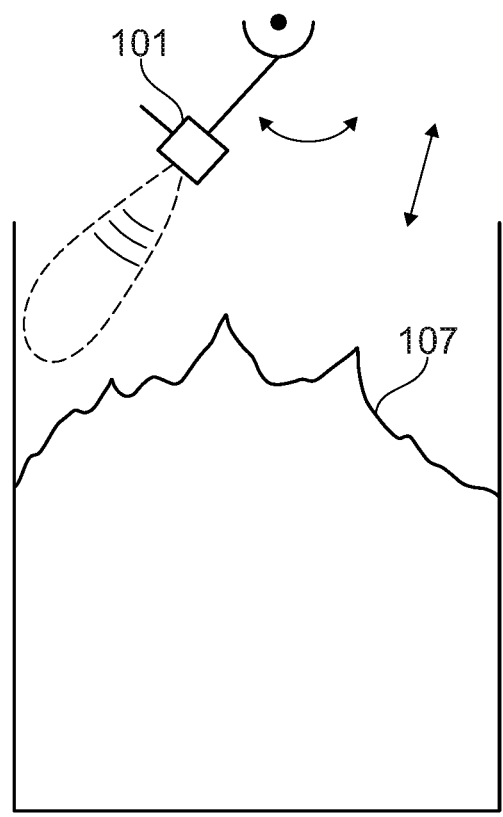
FIG. 1A shows a radar fill level measurement device that is installed in a container and is for recording the topology of the surface of a filling material in the container.

FIG. 1A shows a radar fill level measurement device that is installed in a container and is for recording the topology of the surface of a filling material in the container. Said device may comprise highly integrated radar chips (e.g., RSoCs), which comprise a plurality of transmitters and receivers. These may also be used in fields such as driver assistance systems, traffic monitoring, object monitoring in industrial plants, drones and many other fields. An advantage of multichannel radar chips is that a type of beamforming can be carried out. Radar devices for applications in the field of fill level measurement or recording the topology of filling materials often require a plurality of (e.g., eight or more) radar chips in order to meet the requirements.

The fill level measurement devices that record the topology scan the surface of bulk materials in order to thus obtain more information regarding the actual filling level and the volume thereof than would be obtained in the case of a conventional fill level measurement.

A difference from other possible uses is that just small beam widths are required even at a large distance, which is associated with a large antenna aperture.

Figure 1B:
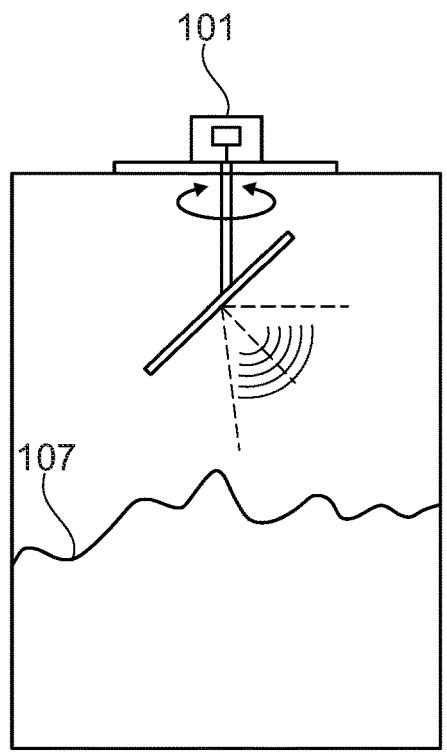
FIG. 1B shows a further radar fill level measurement device.

An option for achieving this is to mechanically pivot a single-channel radar device (FIG. 1A) in order to thus scan the surface. Semi-mechanical systems (FIG. 1B) are a further option. In this case, a combination of analogue or digital beamforming is combined with mechanical pivoting.

Figure 1C:
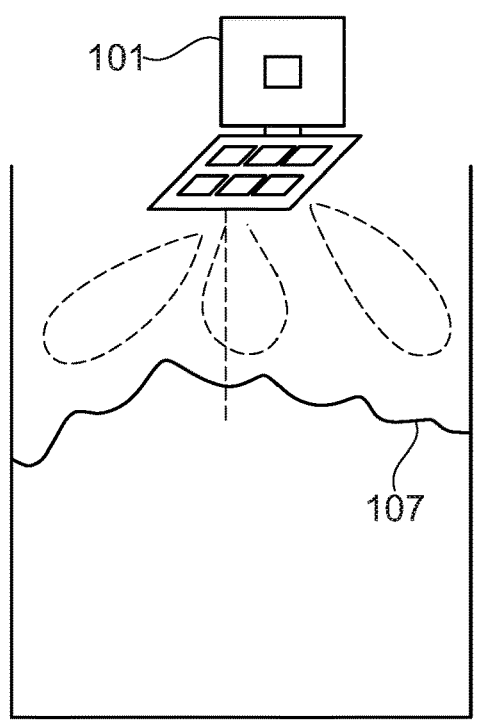
FIG. 1C shows a further radar fill level measurement device.

These systems are disadvantageous in terms of robustness. Mechanical components are susceptible to maintenance in harsh process conditions, and are expensive to manufacture. It is therefore proposed to carry out fully electronic beamforming (FIG. 1C).

Figure 2:
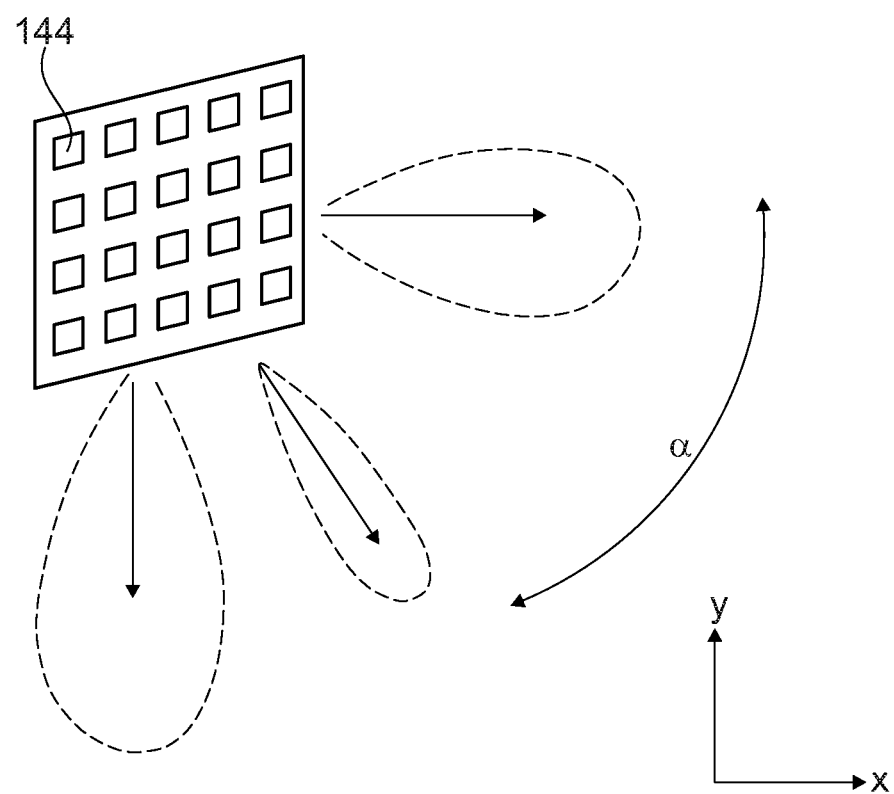
FIG. 2 shows an array antenna of a radar fill level measurement device.

In order to achieve antenna apertures of a comparable size using said beamforming radar systems, it is possible for a large number of transmitters and receivers to be provided. The disadvantage of fully electronic beamforming is that a plurality of antennae having relatively small single apertures have to be used. Moreover, the transmitters and receivers, which are usually each provided with an antenna element 144, 303, have to be aligned in two dimensions (x- and y-direction) (FIG. 2).

Fill level measurement technology for recording the topology therefore usually requires more transmitters and receivers than the above applications, resulting in a number of chips greater than four.

The radar fill level measurement devices for recording topology often comprise a plurality of transmission and reception antennae. These systems are also referred to as MIMO (multiple input multiple output) systems. Known methods of digital beamforming make it possible to digitally influence the directivity of the transmission and reception group antennae both on the transmission side and on the reception side, as a result of which it is possible to scan a filling material surface.

To date, said fill level measurement devices use a plurality of discrete high-frequency components, such as mixers, low-noise amplifiers, couplers, frequency multipliers, voltage-controlled oscillators, etc., as well as discrete analogue-to-digital converters, phase-locked loops, voltage controllers, filters, amplifiers, and further low-frequency components for each transmission and reception channel. This property makes MIMO systems complex, large, and expensive.

The highly integrated radar chips have already completely integrated a plurality of said above-mentioned components on one chip 301. For example, the following are integrated: PLL, VCO, mixers, ADCs, filters, control units, SPI interfaces, amplifiers, switches, voltage controllers. As a result, it is possible to save a large amount of space on a printed circuit board. Said chips 301 are also advantageous with regard to costs, since they are cheaper than a discrete construction comprising a plurality of different individual components.

The radar chips 301 comprise three transmission and four reception stages, for example. A possible transmission frequency range may, for example, be between 55 GHz and 65 GHz or between 75 GHz and 85 GHz.

The radar chips 301 can be parameterised using a digital interface (comprising an associated bus 305) (SPI, PC, etc.). Various parameters can be set or read out in order to adjust the modulation type, bandwidth, frequency range, scanning frequency, IF filter characteristics (intermediate frequency signal), etc. The analogue IF signals that contain information regarding the spacings and angles of objects from the monitoring region are generally likewise still digitised on the radar chip 301 for further signal processing.

The radar method according to which said radar chips 301 generally operate is a specific FMCW method. However, during a measurement process, not just one frequency ramp is modulated, but instead a plurality in succession, which ramps are in a specified temporal relationship with one another. A possible number of ramps per measurement is 128, for example. Said 128 ramps are referred to, in combination, as a frame.

Expedient signal processing algorithms make it possible to also determine speeds of a plurality of objects in addition to spacings. The ramp duration is very short compared with the conventional FMCW method and is generally in the range of between 10 µs and 500 µs per ramp. Since the HF bandwidth of the transmission signals may be in the range between several hundred megahertz and four (or more) gigaherrtz, the intermediate frequency signal must be digitised at a high sampling rate.

The combination of a high HF bandwidth and short ramp durations results in a high sampling rate during the analogue-to-digital conversion.

The interface for the digitised output signal is usually a high-speed, serial, differential digital interface 304 such as LVDS or CSI2. In the example of a radar chip 301 comprising four reception channels, the digital interface of the radar chip 301 comprises four LVDS or CSI2 interfaces, via which the digitised intermediate frequency signal is transmitted. In addition, said digital interfaces use an additional differential clock signal that is required at the receiver of the digitised data in order to synchronise the interfaces. Depending on the interface, further signal lines are also required in order to mark the start and/or end of the data packets.

Figure 3:
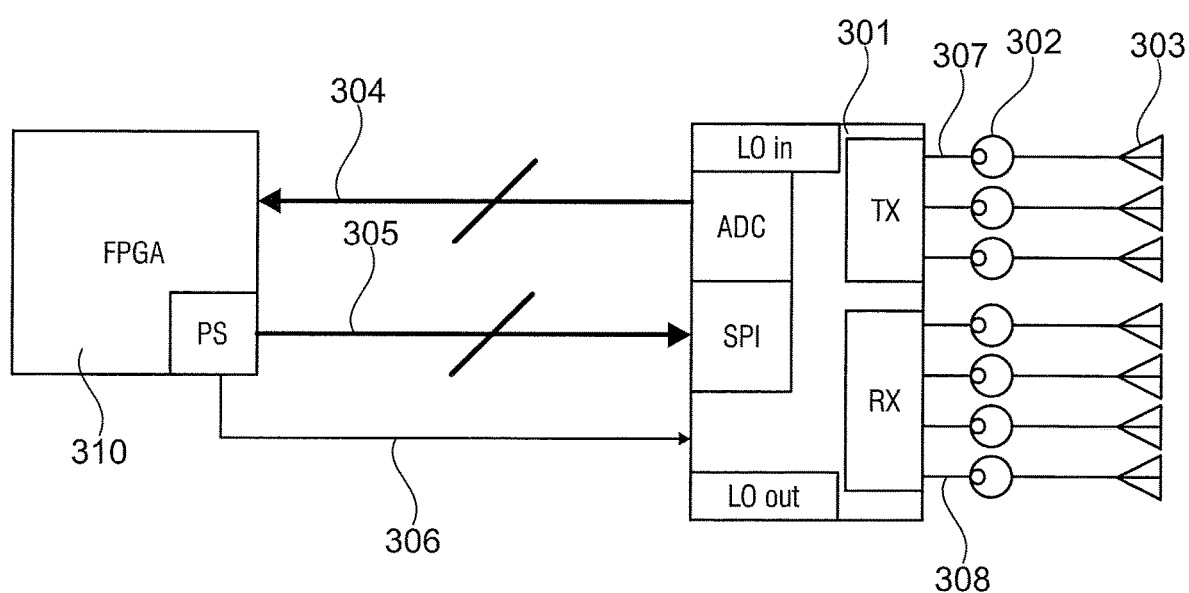
FIG. 3 shows the structure of a radar fill level measurement device comprising a radar chip.
Figure 4A:
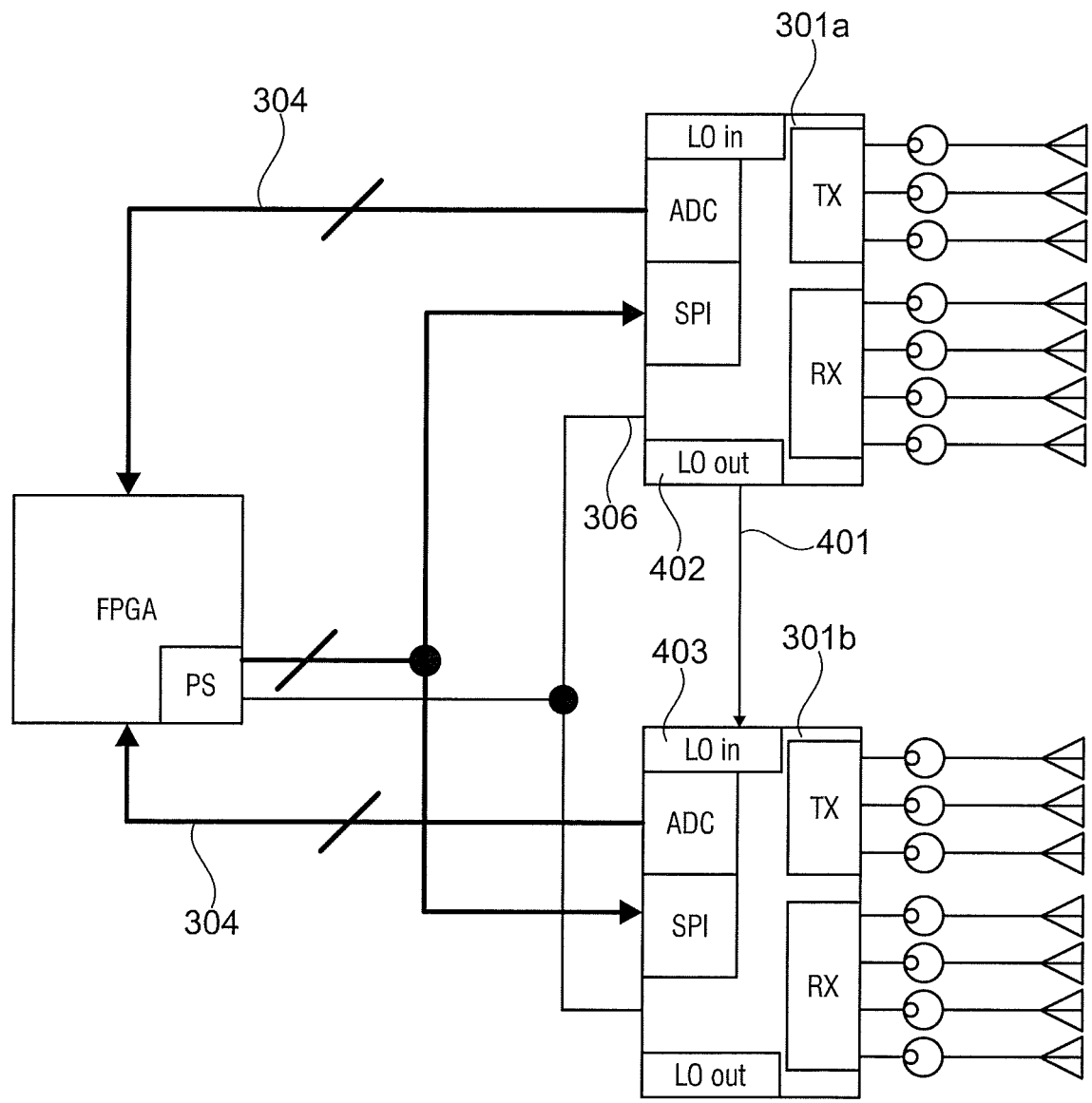
FIG. 4A shows the structure of a further radar fill level measurement device comprising two radar chips.
Figure 4B:
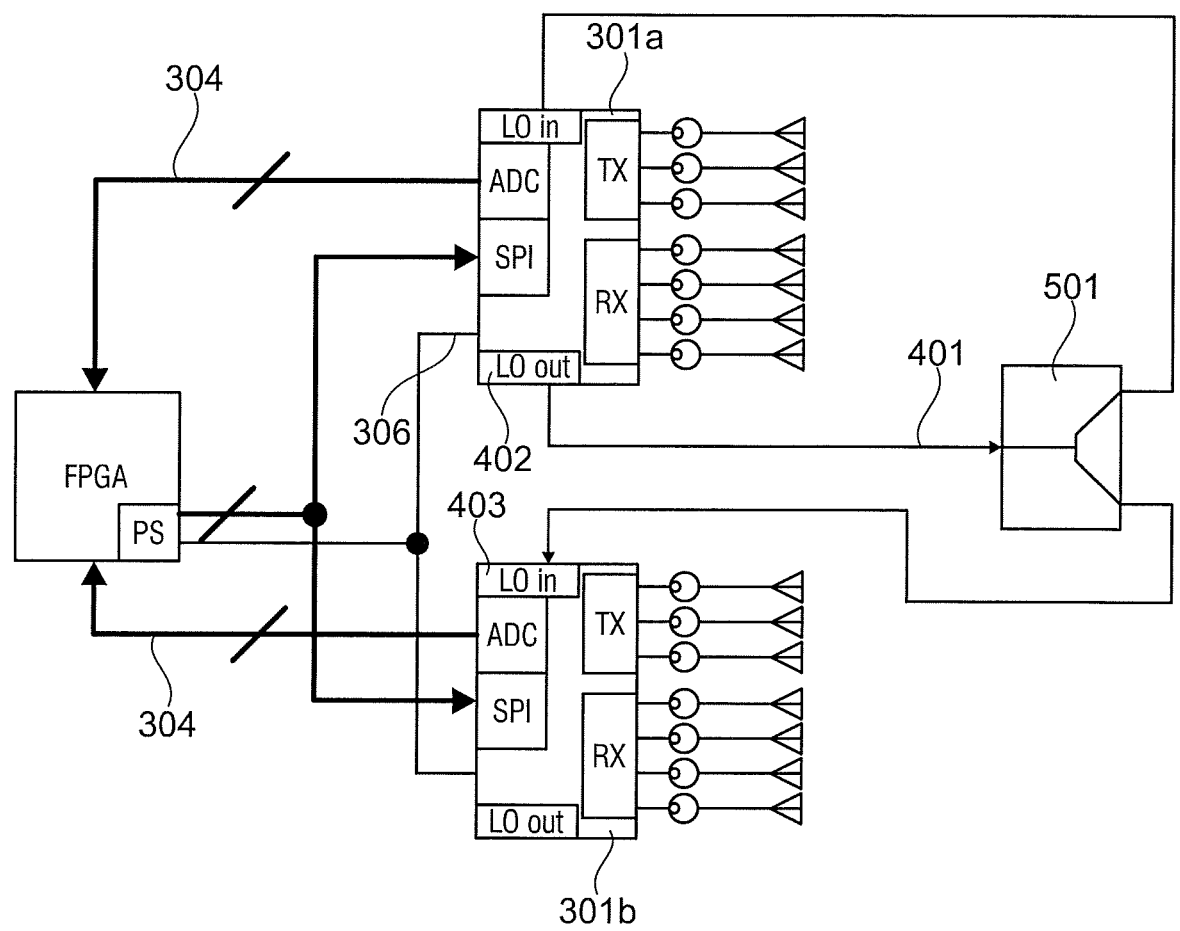
FIG. 4B shows the structure of a further radar fill level measurement device.

In the event of the radar chip 301 nonetheless providing too few transmission and reception channels 307, 308 (FIG. 3) for the desired application, said chips 301 provide the option of cascading. This means that a plurality of chips are combined to form a synchronised radar unit. It is thus possible for the transmitters to transmit simultaneously using a synchronous signal and/or for the receivers to receive synchronously, despite being physically located on different RSoCs.

This is possible because, in addition to various clock-synchronisation lines, a high-frequency signal on a high-frequency line 401 is also distributed from one chip to other chips. The high-frequency signal is referred to as a local oscillator signal (LO signal) and, in terms of frequency range, is a signal that is divided by an integer factor with respect to the transmission frequency range.

Dividing factors of two or four, but also other integer dividing factors, are possible. If the radar chip has a transmission frequency of approximately 80 GHz, for example, the LO signal can thus have a frequency of approximately 20 GHz or 40 GHz.

The radar chip that provides the high-frequency signal is referred to as the master 301a. The chips that receive the high-frequency signal are referred to as slaves 301b.

For example, a cascaded radar system that contains four radar chips (FIG. 5), which in turn each comprise four reception channels, has sixteen digital interfaces via which the associated intermediate frequency signals (measurement data) are transmitted.

In order to process said digital measurement data, the radar chips generally use specifically adapted signal processors which, however, have a very limited number of digital interfaces. Some manufacturers have even integrated units for digital signal processing onto the radar chip itself, but this is of only limited use or cannot be used at all for cascading radar chips and in the context of radar-based fill level measurement for determining topology.

Therefore, in order to avoid this problem, it is proposed to use an FPGA (field programmable gate array) component 310 in place of the specifically adapted signal processor (FIGS. 3, 4A, 4B, and 5). Said components, which can be used universally, are available in various embodiments from a few manufacturers. The FPGA receives the digitised values of the intermediate frequency signal and assumes computing operations such as averaging, windowing or calculating FFTs (fast Fourier transformation).

An advantage of the combination of radar chips and FPGA is that of a flexible combination of eight or more radar chips, which would not be possible when using a specifically adapted signal processor as is used in the automobile industry. Cascading such a large number of radar chips makes this technology of interest for fill level measurement technology.

If a far larger number of radar chips is required, it is possible to also use a plurality of FPGAs and to then likewise mutually synchronise these.

The FPGA advantageously comprises, in addition to the programmable logic cells, an integrated processor system (PS) that can assume control tasks, such as parameterisation of the radar chip, energy management, control of a display, or communication with a computer or a process control point via a network. The processor system can also signal the start of a measurement, via a digital line 306.

Furthermore, the processor system can assume signal processing tasks such as are known from existing fill level radar measurement devices, such as echo searching, suppression of spurious echoes, etc.

Depending on the type of radar chip and FPGA, it may be necessary to carry out level adjustment of the digital interfaces. A specifically adapted resistor network or an adjustment chip may be used for this purpose.

Since the digital interfaces via which the digitised IF signal is transmitted usually consist of one differential pair of conductors per channel, discrete line termination resistors have to be provided, depending on the FPGA. Said resistors generally have a value of 100 Ohm.

A further option is to use one or more amplifiers comprising integrated splitters for low-frequency signals which signal the start of a measurement, proceeding from the master. The master emits this signal and distributes it to all the slaves. In this case it is important for the lines to be of approximately the same length in order that there are no temporal offsets in the individual radar chips.

Since a larger number of radar chips can be cascaded in this manner, it is possible that the output stage of the LO signal does not provide sufficient output power for operating all the radar chips. A problem of distributing the LO signal on the high-frequency line 401 is that the path loss in high-frequency lines is not insignificant. Since the radar chips 301 are usually spatially separate from one another on the circuit board 904 by several centimetres (order of magnitude: 5-10 cm), the high-frequency lines 401 that conduct the LO signal have to be just as long. The loss of a typical microstrip line on a standard high-frequency substrate may be of between 0.5 dB/cm and 2 dB/cm. This depends mainly on the substrate and the frequency. In contrast, waveguides can be constructed so as to have a far smaller path loss. For this reason, it is expedient to couple the signal into a waveguide after the LO signal has been decoupled on the circuit board 904 by means of a microstrip line, in order to experience fewer losses on the path distance to the adjacent chip.

Figure 6:
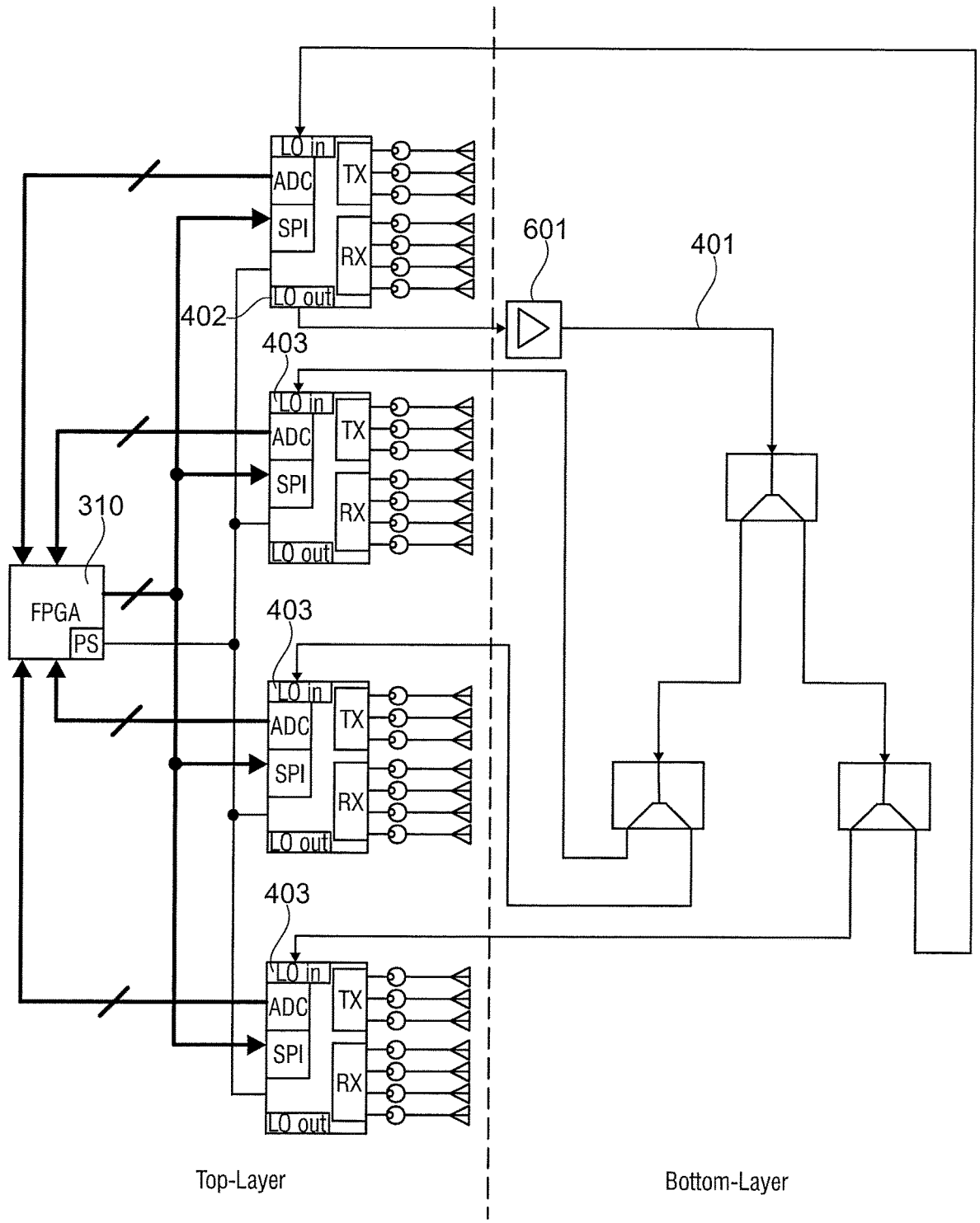
FIG. 6 shows the structure of a further radar fill level measurement device.
Figure 7:
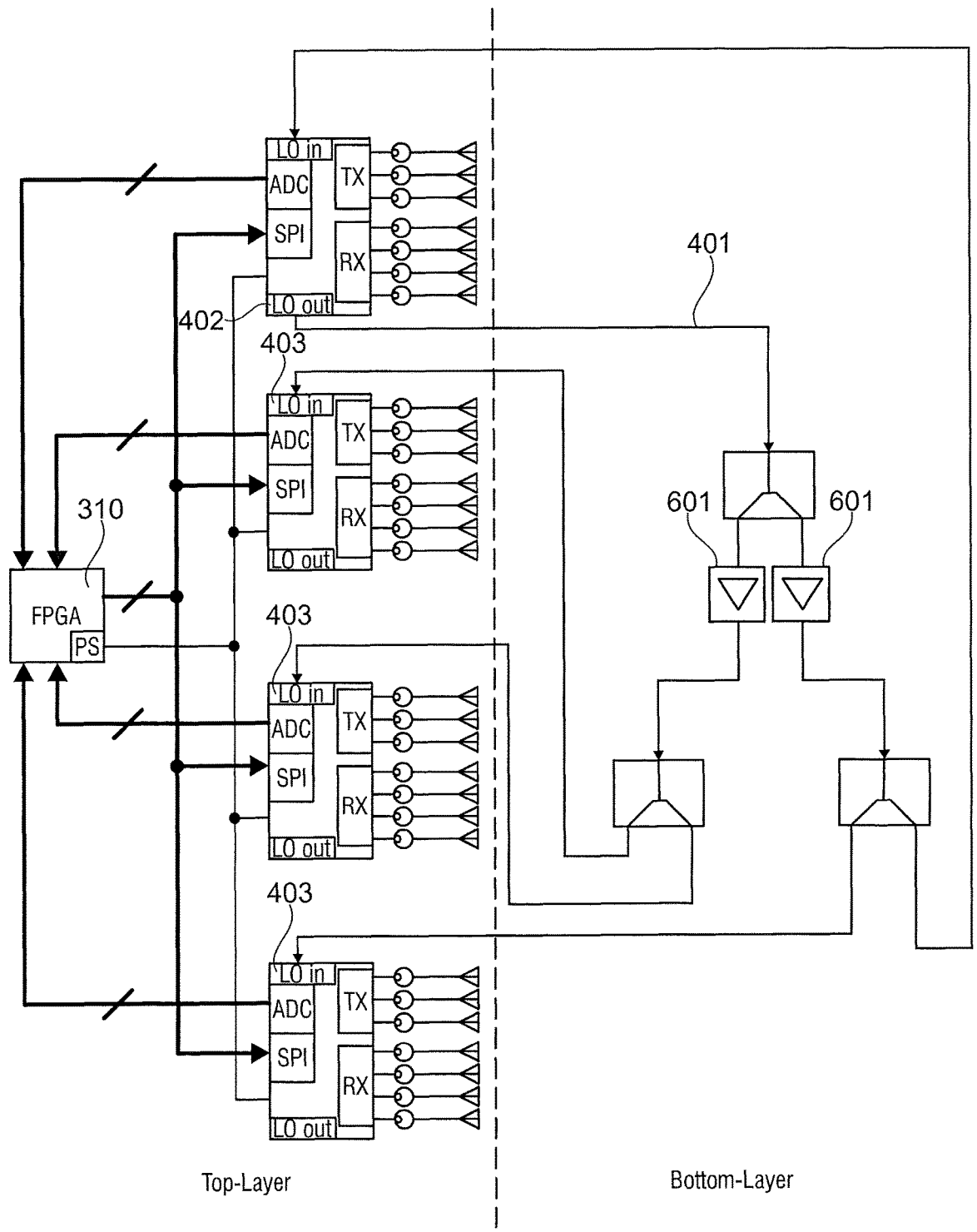
FIG. 7 shows the structure of a further radar fill level measurement device.

A further possible option is that of using one or more external high-frequency amplifiers 601 in order to amplify the HF power of the LO signal on the high-frequency line 401 (FIGS. 6 and 7). Said amplifiers advantageously have a low noise figure, since this figure has a direct impact on the system performance. Low-noise amplifiers (LNAs) are therefore proposed for this purpose. Said LNAs are active components comprising a separate voltage supply. Said amplifiers are advantageously disconnected between the radar frames and/or in transmission breaks in order to save energy and in order to prevent overheating of the device.

Furthermore, care must be taken that the LNAs are operated in the linear range thereof, meaning that the input power of the high-frequency signal is not too high. If this is the case, signal distortions may occur. Owing to the technology, typical output powers of semiconductor components are between 8 dBm and 15 dBm at 80 GHz without substantial signal distortions occurring.

If a high-frequency signal having a power of 15 dBm is fed to a high-frequency amplifier 601 having a gain of 20 dB, an output power of 35 dBm would theoretically result. However, since the high-frequency amplifier 601 would then no longer operate in the linear range thereof, undesired signal distortions would occur. Therefore, the LO signal must firstly be brought into a power range such that the high-frequency amplifier 601 can operate in the linear range thereof. It is possible to parametrise, and thus attenuate, the LO output power of the radar chip 301. Likewise, a long high-frequency line can also attenuate the output power.

It is possible that the high-frequency amplifiers may also be used only once the LO signal has been divided, using a high-frequency power splitter, and thus the power thereof has been reduced. This is the case when a plurality of slaves 301b are used or when, depending on the radar chip 301, the LO signal is to be returned to the master 301a again.

In this case, a plurality of amplifiers have to be used, as shown in FIG. 7. Since an amplifier also has a finite signal processing time, the amplifiers are advantageously positioned such that substantially the same signal transit time is established on all the lines.

Figure 10A:
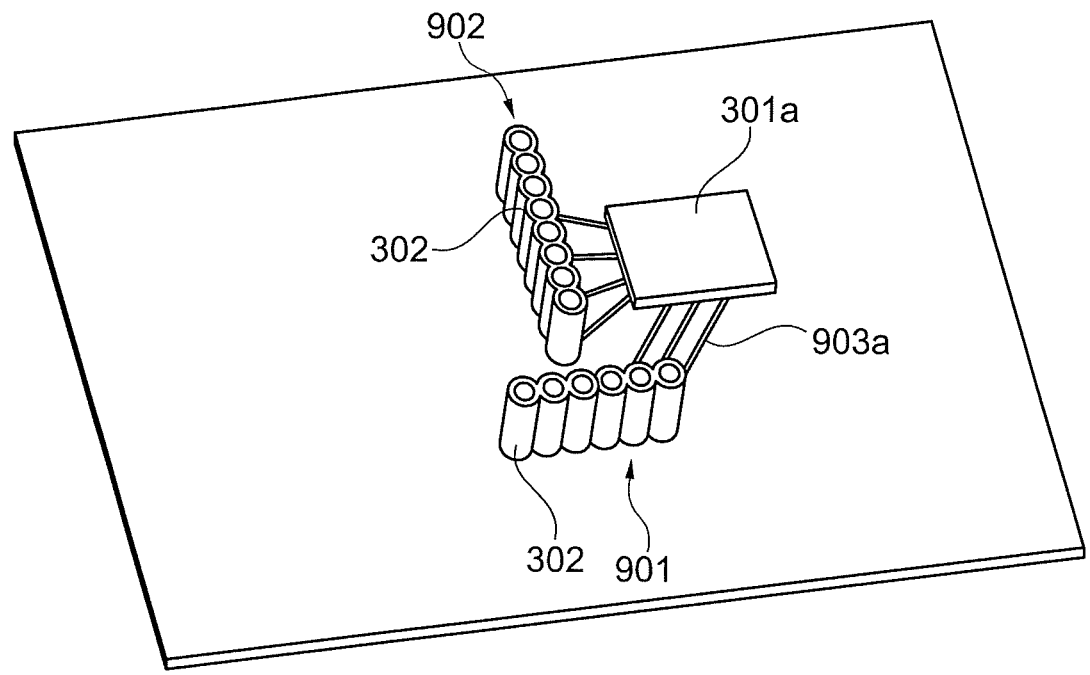
FIG. 10A shows the top of a circuit board comprising a radar chip and waveguide assembly.
Figure 10B:
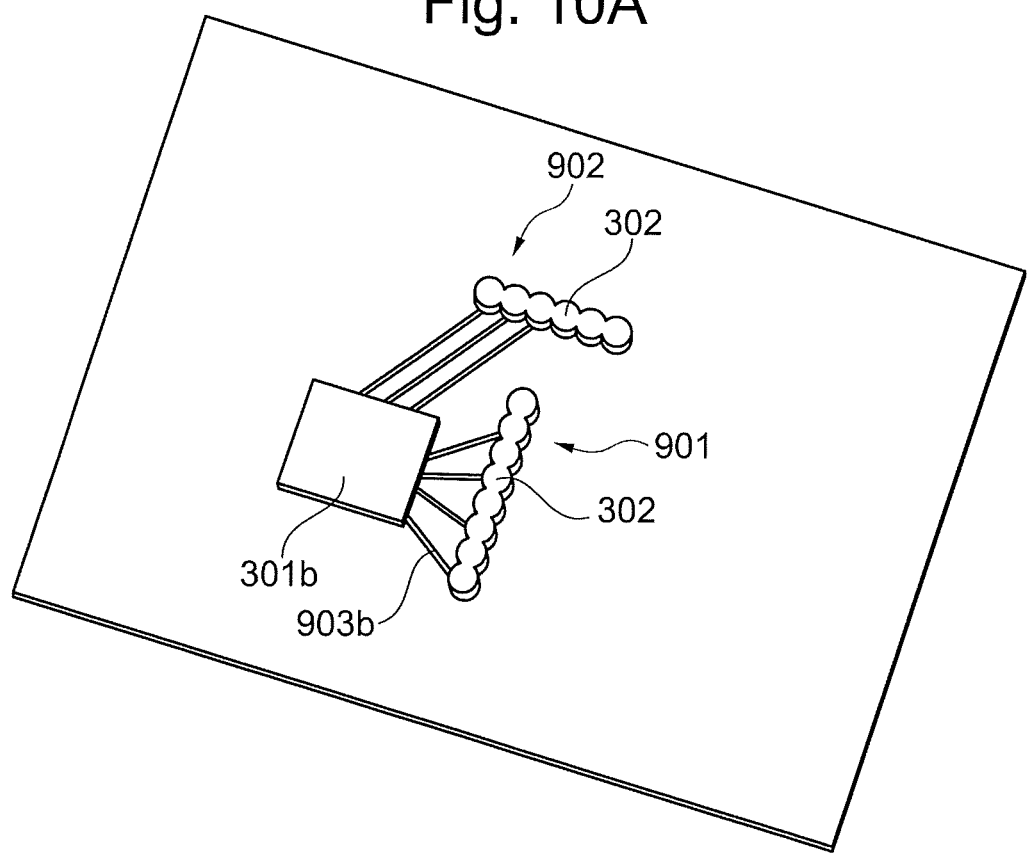
FIG. 10B shows the circuit board from FIG. 10A seen from the bottom.

Since the LO signal is a high-frequency signal, waveguides, microstrip lines 903 and/or SIW (substrate integrated waveguide) lines 1002 (FIG. 10A) are advantageously used. Likewise, in order to split the line, power splitters 501 (e.g., Wilkinson divider) and/or couplers 501 (e.g., rat-race coupler) are advantageously used.

Figure 5:
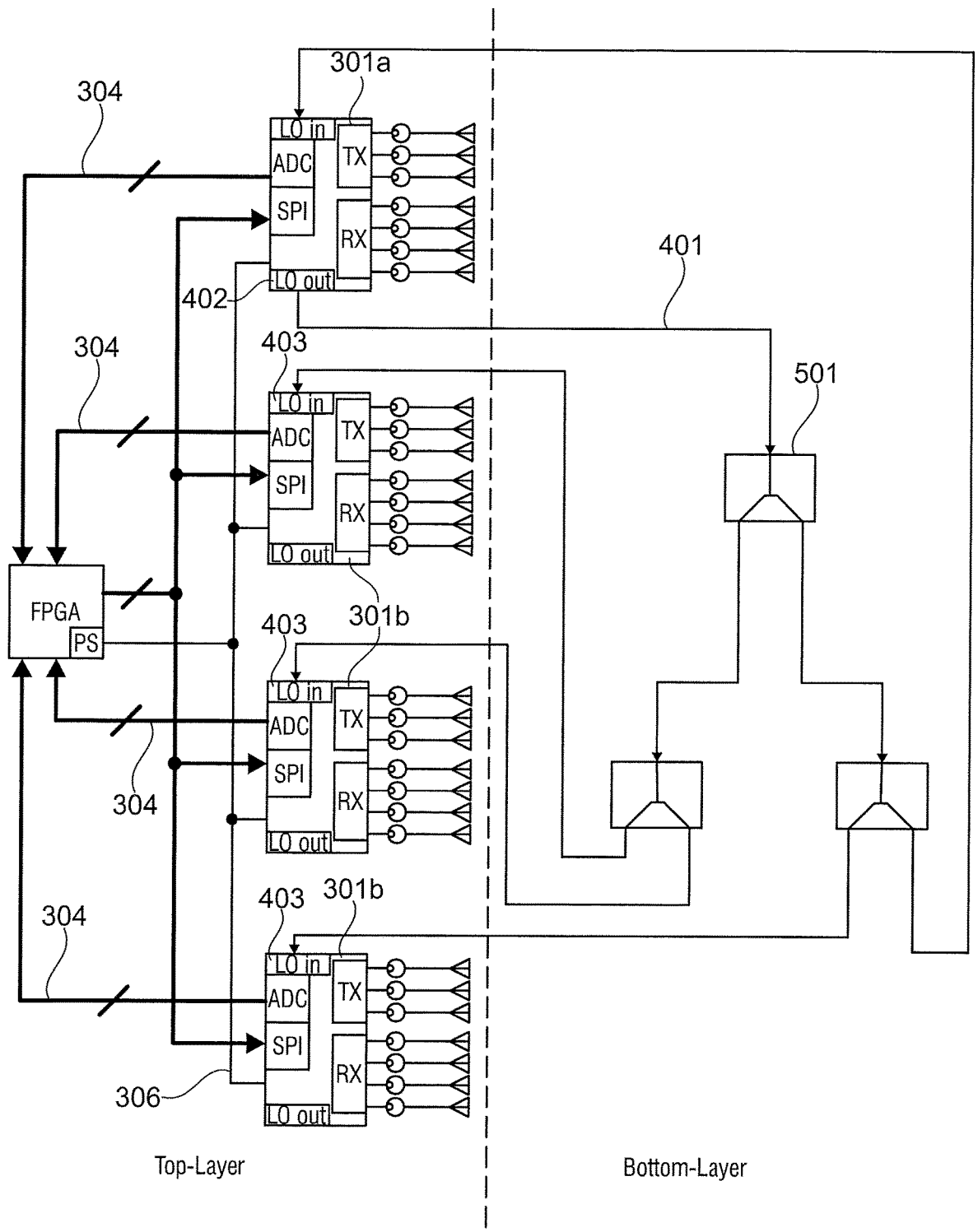
FIG. 5 shows the structure of a further radar fill level measurement device.

For example, the radar chips are positioned on a face (or plane) 801, 802 of the circuit board 904, and the division and distribution of the LO signal takes place on the other face or plane 808, 809 of the circuit board 904, as is shown in FIGS. 5 to 7. The reason for this is explained in the following.

The radar chips usually comprise nine or ten signal inputs and signal outputs, the frequency range of which is in the two-digit gigahertz range. When cascading the radar chips, in addition to the lines to the transmission and reception antennae, the LO signal also has to be routed from chip to chip. This plurality of signal lines means that intersections of signals are often unavoidable.

Figure 8:
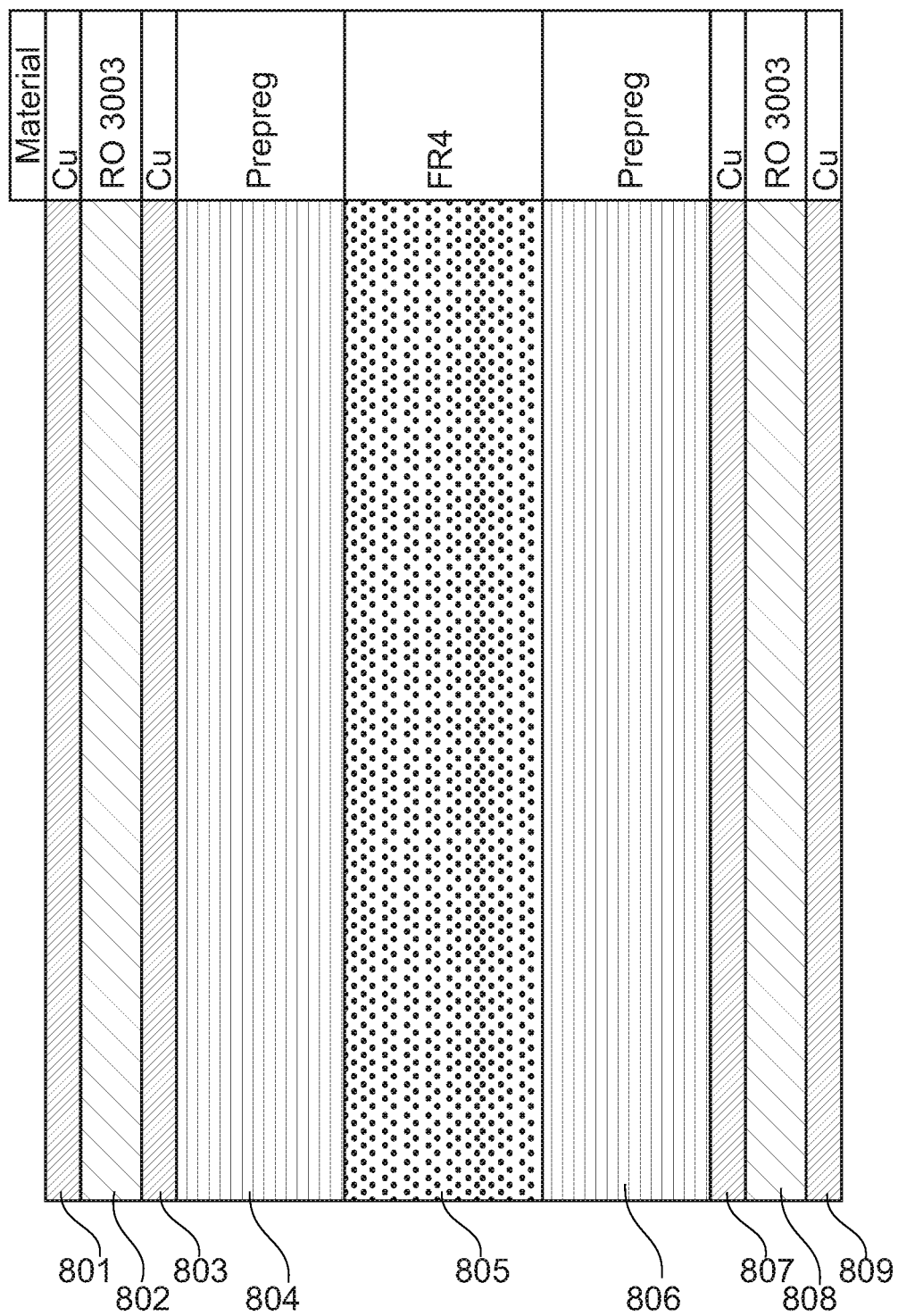
FIG. 8 shows a circuit board layer structure.

However, since intersections of signal lines are not possible on a circuit board 904, the signals are usually conducted by vias into an internal circuit board plane (internal layer) 803, 807 and conducted past one another there. FIG. 8 shows a typical circuit board structure, a plurality of substrates being adhesively bonded together using an adhesive foil 804, 806. However, internal layers of circuit boards 904 are usually standard substrate materials 804, 805, 806 and are not suitable for high-frequency signals. Specifically, for reasons of cost and sturdiness, often only one or both of the outermost substrate layers 802, 808 of a circuit board 904 are constructed from substrate material that is specifically optimised for high-frequency technology (for example Rogers RO3003). High-frequency substrates are generally flexible and have to be very thin at high frequencies, for example, having a thickness of 127 μm. The outer layers 801, 809 are metallized layers.

Figure 12A:
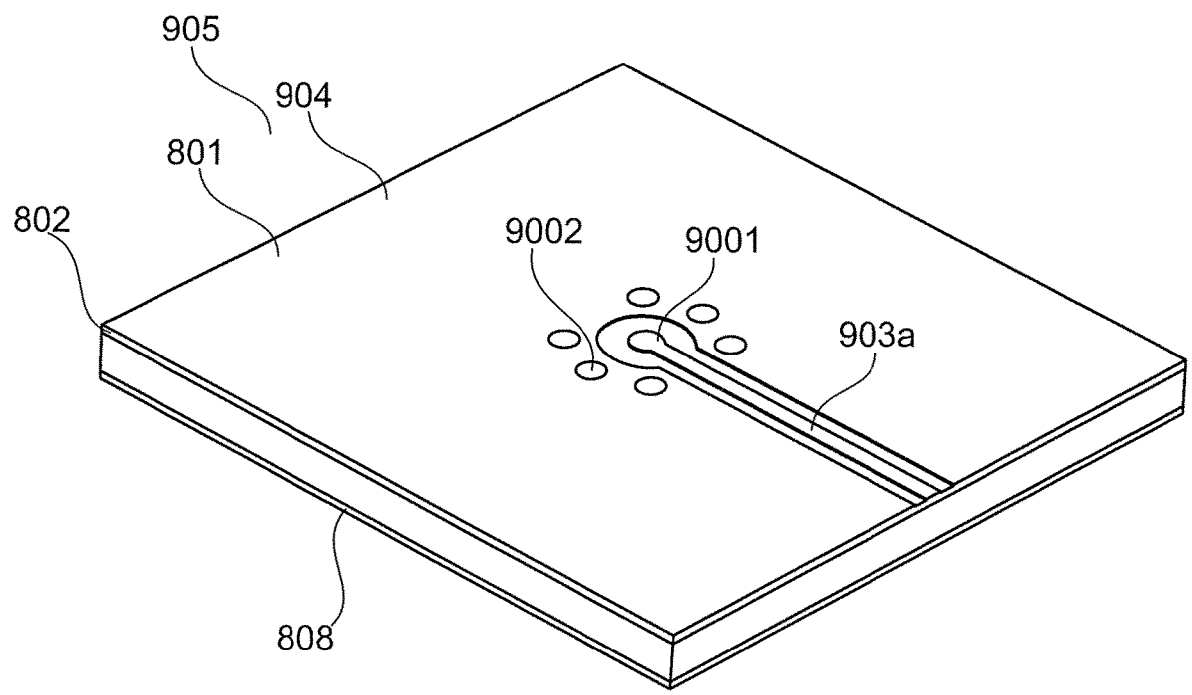
FIG. 12A shows a via assembly of a radar fill level measurement device.
Figure 12B:
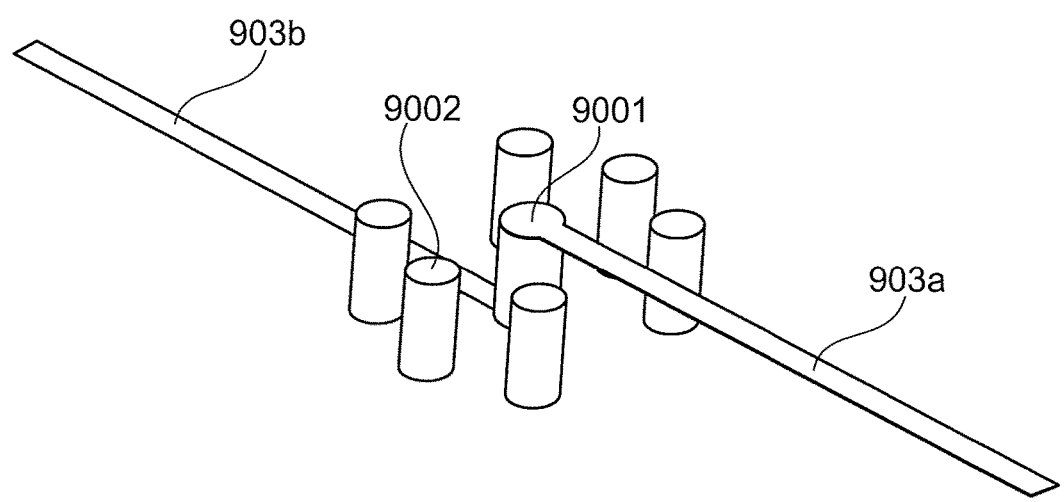
FIG. 12B shows the metallised elements of the via arrangement from FIG. 12A.

For these reasons, it is proposed to conduct the LO signal from the circuit board plane on the chip side to the rear face using specific line structures and via assemblies, and to split, optionally amplify, and distribute said signal on said rear face and return it again to the circuit board plane on the chip side. Specific line structures and via assemblies of this kind can be seen in FIGS. 12A and 12B (FIG. 12B shows the line and vias without the substrate materials and copper surfaces). In this case, further subsidiary vias 9002 are positioned at a constant radius around the main via 9001 and thus form a type of coaxial printed circuit board feedthrough. The via diameter and the spacing from the main via primarily determine the impedance of the feedthrough and have to be adapted to the frequency range used, for example, 40 GHz.

An alternative option for routing the LO signals without the lines intersecting is to couple the signal into a waveguide or a coaxial cable and to construct the waveguide or coaxial cable such that the lines lead past one another. For coupling into a waveguide, for example, it is possible to use what is known as a waveguide transition from the microstrip line to the waveguide.

The substrate integrated waveguide (SIW) is also an expedient line type. Said line type is advantageously used for example when a waveguide is resting directly on a printed circuit board/circuit board 904 on which an LO/HF signal needs to be routed through below the waveguide using a microstrip line. Since the waveguide usually consists of a metal, it would short-circuit the microstrip line, making signal transmission impossible. The SIW is advantageous in this case, since it comprises a pure metal surface on the upper face of the circuit board and it does not matter if a waveguide is located thereunder.

Subsequently, the signal must again be coupled into a microstrip line on the circuit board 904 in order to be able to be routed into the radar chip.

In the manner described above, it is possible to cascade a plurality of radar chips over one LO signal and a plurality of low-frequency signals. Since the radar chips all comprise the same housing and the same pin configuration, the cabling for the high-frequency signals from the transmission pin to the antenna or vice versa from the antenna to the reception pin may involve long lines (FIG. 9), which are undesirable since long high-frequency lines are always associated with significant losses. These problems are explained in greater detail in the following:

Robust antenna means that still function even in harsh process conditions, such as high and low pressures, high and low temperatures, dirt, dust, humidity, mist, etc. are characteristic of radar fill level measurement devices. In addition, the antennae must also protect the electronics from the above influences, and additionally be constructed such that they also comply with safety-critical aspects such as explosion protection.

These properties thus also have to be ensured in the case of radar fill level measurement devices for recording topology. Unlike in the case of radar devices for other applications, in which requirements of this kind are less stringent, waveguides and horn radiators are often used in process measurement technology.

It is advantageous in the case of systems for digital beamforming for one or more antenna elements to have a spacing of $\leq \lambda/2$, $\lambda$ denoting the wavelength of the transmission signal. In cases of this kind, specific waveguide couplings 302 have to be used in order to couple the signal from a printed circuit board into a (horn) antenna 303.

Figure 9:
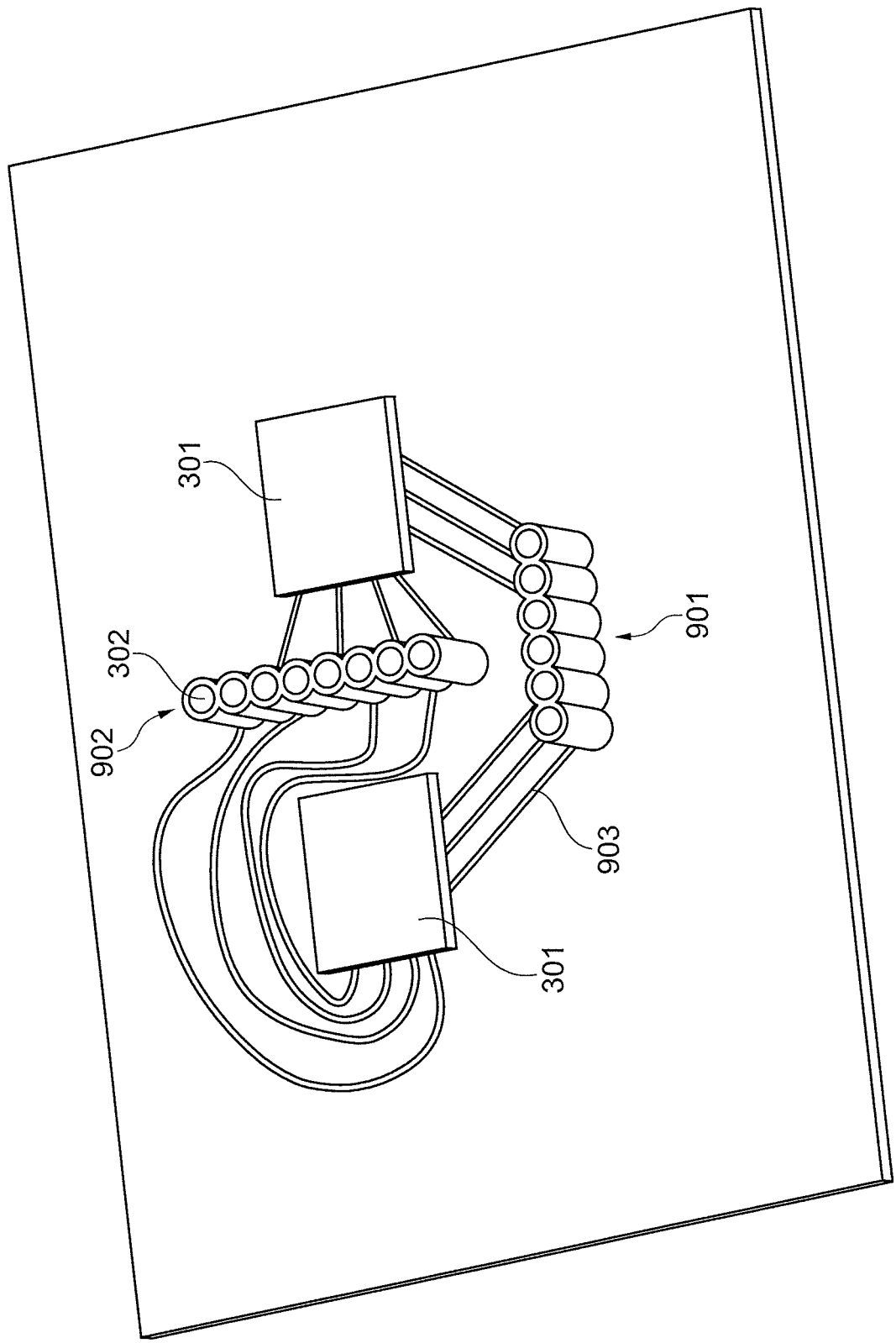
FIG. 9 shows two radar chips and a waveguide assembly.

A further problem in the case of topology-recording radar fill level measurement devices comprising cascaded radar chips is that the above-mentioned antennae may only be arranged in specific patterns. An advantageous pattern would be a T-shaped or L-shaped arrangement of the antenna elements. In order to prevent significant line lengths, as shown in FIG. 9, in the case of high-frequency signals, it is proposed to position the radar chips 301a, 301b on the top and bottom of the circuit board (FIGS. 10A, 10B, 11A, and 11B) in order that the line lengths of the lines 903a, 903b from the relevant radar chip 301a, 301b to the waveguide coupling are substantially the same length for all the HF signals.

Figure 11A:
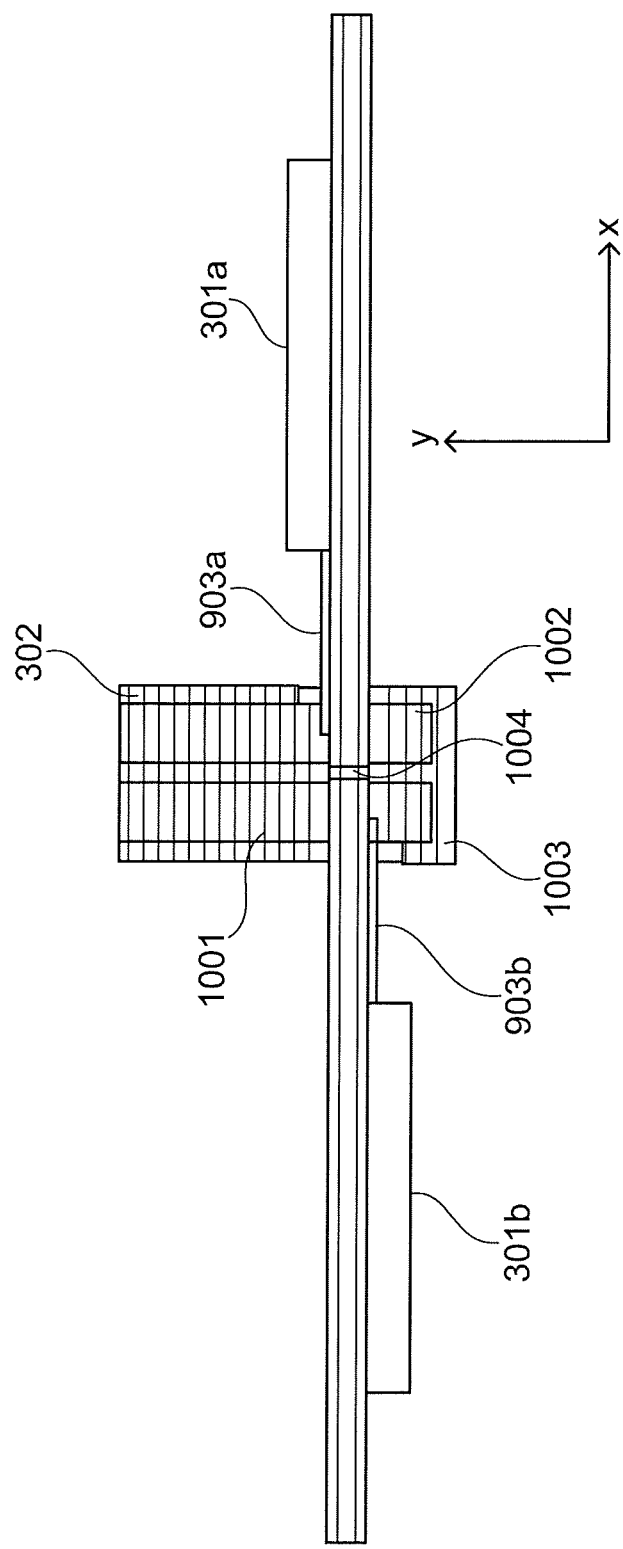
FIG. 11A is a cross section of a circuit board comprising radar chips and a waveguide assembly.
Figure 11B:
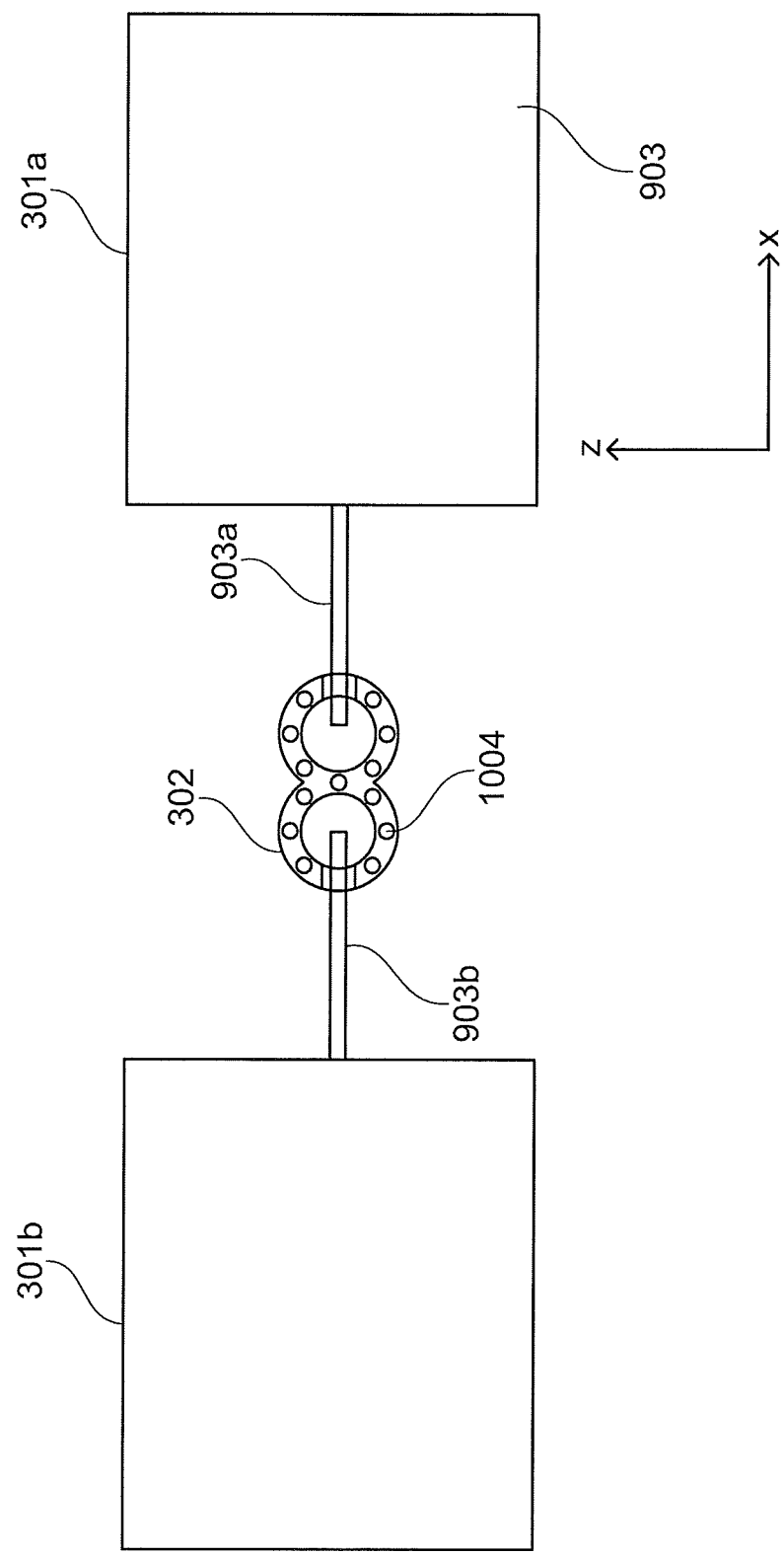
FIG. 11B is a plan view of the arrangement from FIG. 11A, comprising a transparent circuit board.

For this purpose, in addition to the above-mentioned transitions, further transitions are also required, which further transitions radiate through the circuit board and couple the electromagnetic waves, conducted by the lines 903, into a waveguide on the rear face of the circuit board (see FIGS. 11A and 11B).

What is new in this case is that the backshorts used, which form a resonator cavity 1002, can be filled with a dielectric material 1001. This may be important in this case, since the transitions between the microstrip line 903 and the waveguide sometimes have to be less than $\lambda/2$. An additional dielectric material in the waveguide and in the resonator means that the dimensions thereof are reduced.

The dielectric material preferably has a relative permittivity of greater than 2, for example between 3 and 4, and as small a loss angle as possible.

In order that the radar signal does not cross-couple from one waveguide into the other waveguide, vias 1004 are positioned in the circuit board.

In the case of FIG. 11A, the radar signal propagates in the y-direction. As shown in FIG. 11B, the waveguides 302 can be formed inside the circuit board by means of vias 1004 in the form of pin-like plated through-holes that are arranged in an annular manner in the region of the waveguide wall. For example, the radar chip 301a and supply cable 903a are located on the first circuit board plane 802, and the radar chip 301b and supply cable 903b are located on the second circuit board plane 808.

A compensation unit or circuit, which is preferably accommodated in the radar signal analysis unit or circuit that comprises a processor, can compensate for the transition-related phase and amplitude offsets in the signal processing, such that for example different signal transit times, caused for example by different transitions, can be subtracted out. In this case, the analysis unit may be formed by an FPGA, ASIC, DSP, microcontroller, or comparable computation units.

RSoCs are an alternative to compensation, in that, when the signals are transmitted in parallel, the individual transmission channels can be corrected with respect to amplitude and phase in order to compensate for the above-mentioned phase and amplitude offsets. The compensation units on the transmission and reception sides can also be operated together.

In order to cascade the radar signals with a local oscillator signal, it is further proposed to use a coaxial circuit board feedthrough (FIG. 12A and FIG. 12B) (via) to reach the rear face of the circuit board from the master chip.

Furthermore, radar chips can be used, the integration density of which is not as high as that of the above-mentioned radar chips RSoC 301. Said MMICs are often formed without digital parts. Said MMICs then output the analogue IF signals. It is also possible for said chips not to contain a PLL or to likewise still be split into pure transmission and pure reception chips. However, said chips can also be cascaded, with one another and also with RSoCs, over a high-frequency LO signal and one or more low-frequency signals. Said MMICs can also be designed as pure transmission MMICs or pure reception MMICs. In this case, each transmission MMIC may comprise one or more separate transmitters, and each reception MMIC may comprise one or more separate receivers.

In functional terms, an RSoC can be made into a transmission MMIC in that the reception chains and the internal PLL are disconnected using software commands. Likewise, an RSoC can also be made, functionally, into a reception MMIC in that the transmitters are disconnected internally using software commands.

A basic concept of the claimed invention consistent with the described embodiments can be considered that of a radar fill level measurement device 101 that records the topology of a filling material surface in a container being provided, which device consists of (or comprises) a plurality of integrated radar chips 301 are synchronised with one another by means of a high-frequency signal (local oscillator signal) that is generated by a radar chip 301a and conducted on a high-frequency line 401, the radar chips being positioned on either side of a circuit board.

Transitions between the microstrip line and the waveguide can be used for connecting the radar chip and the antenna.

In particular, it is possible to use transitions that radiate through the circuit board and transitions that do not radiate through the circuit board, the backshorts required for the transitions that radiate through the circuit board being filled with a dielectric material for example.

It is also possible for the analysis unit for the radar signals to be equipped with a compensation unit in order to compensate for transition-related amplitude and phase offsets.

It is also possible for the transmission unit for the radar signals to be equipped with a compensation unit in order to compensate for transition-related amplitude and phase offsets.

The analysis unit may be an FPGA, an ASIC, a DSP, or a microcontroller.

It is possible for the transmission and/or reception channels to be able to be disconnected in order to save energy and to reduce heating of the circuit.

At least one of the radar chips positioned on the rear face of the circuit board may be a transmission MMIC, a reception MMIC, or an RSoC.

In particular, inter alia, coaxial circuit board feedthroughs may be used in order to synchronise the radar chips with one another.

For the sake of completeness, it should be noted that "comprising" and "having" do not exclude the possibility of other elements or steps, and "one" or "a" does not exclude the possibility of a plurality. It should further be pointed out that features or steps described with reference to one of the above embodiments may also be used in combination with other features or steps of other above-described embodiments. Reference signs in the claims should not be treated as limiting.

We claim:

1. A radar fill level measurement device for fill level measurement or for recording a topology of a filling material surface in a container, comprising:
    a circuit board comprising a top circuit board surface and a bottom circuit board surface; and
    a first radar chip on the top circuit board surface and a second radar chip on the bottom circuit board surface,
    wherein the first radar chip and the second radar chip each comprise one or more transmission channels configured to generate a transmission signal, and one or more reception channels configured to receive the transmission signal that is reflected at the filling material surface,
    wherein at least one of the transmission channels of the first radar chip is connected, via a first line, to an antenna assembly for radiating the transmission signal,
    wherein at least one of the reception channels of the second radar chip is connected, via a second line, to the antenna assembly for receiving the reflected transmission signal,
    wherein the antenna assembly comprises a first waveguide configured to radiate the transmission signal towards the filling material surface,
    wherein the antenna assembly comprises a second waveguide configured to receive the reflected transmission signal,
    wherein the second waveguide comprises an end region that is positioned on the bottom of the circuit board,
    wherein the second waveguide further comprises a main region that is positioned on the top of the circuit board, and
    wherein a plurality of plated through-holes is arranged inside the circuit board, between the end region and the main region, in order to also form the second waveguide inside the circuit board.

2. The radar fill level measurement device according to claim 1,
    wherein the first waveguide, or the second waveguide, or the first and second waveguides, connects the top circuit board surface to the bottom circuit board surface.

3. The radar fill level measurement device according to claim 1,
    wherein the first waveguide, or the second waveguide, or the first and second waveguides, comprises a resonant cavity in an end region thereof, the resonant cavity being filled with a dielectric material.

4. The radar fill level measurement device according to claim 1,
    wherein the first line is arranged on the top circuit board surface.

5. The radar fill level measurement device according to claim 1,
    wherein the second line is arranged on the bottom circuit board surface.

6. The radar fill level measurement device according to claim 1,
    wherein the first radar chip comprises a first synchronisation circuit configured to generate a high-frequency signal,
    wherein the second radar chip comprises a second synchronisation circuit,
    the device further comprising a high-frequency line assembly configured to transmit the high-frequency signal from the first synchronisation circuit to the second synchronisation circuit in order to synchronise the first radar chip and the second radar chip,
    wherein the high-frequency line assembly comprises a first strip conductor on the top circuit board surface, a second strip conductor on the bottom circuit board surface, and a via arranged therebetween configured to interconnect the first strip conductor and the second strip conductor.

7. The radar fill level measurement device according to claim 6,
    wherein the high-frequency line assembly further comprises two or more different line types arranged in series with one another.

8. The radar fill level measurement device according to claim 6,
    wherein the high-frequency line assembly further comprises a high-frequency amplifier arranged in the high-frequency line assembly and being configured to amplify the high-frequency signal.

9. The radar fill level measurement device according to claim 6,
    wherein the high-frequency line assembly further comprises a waveguide.

10. The radar fill level measurement device according to claim 1, wherein a first analogue-to-digital converter is integrated in the first radar chip, and a second analogue-to-digital converter is integrated in the second radar chip.

11. The radar fill level measurement device according to claim 1, the device being configured to record a topology of a medium in a container.

12. The radar fill level measurement device according to claim 1, the device being configured as an FMCW fill level measurement device.

* * * * *